Sept. 26, 1967  H. A. FOUKE  3,344,268
REFRACTOR FOR USE IN UNIFORMLY ILLUMINATING A POLYGONAL AREA
Original Filed Sept. 12, 1963  3 Sheets-Sheet 1

INVENTOR.
HERBERT A. FOUKE
BY
Nolte & Nolte
ATTORNEYS

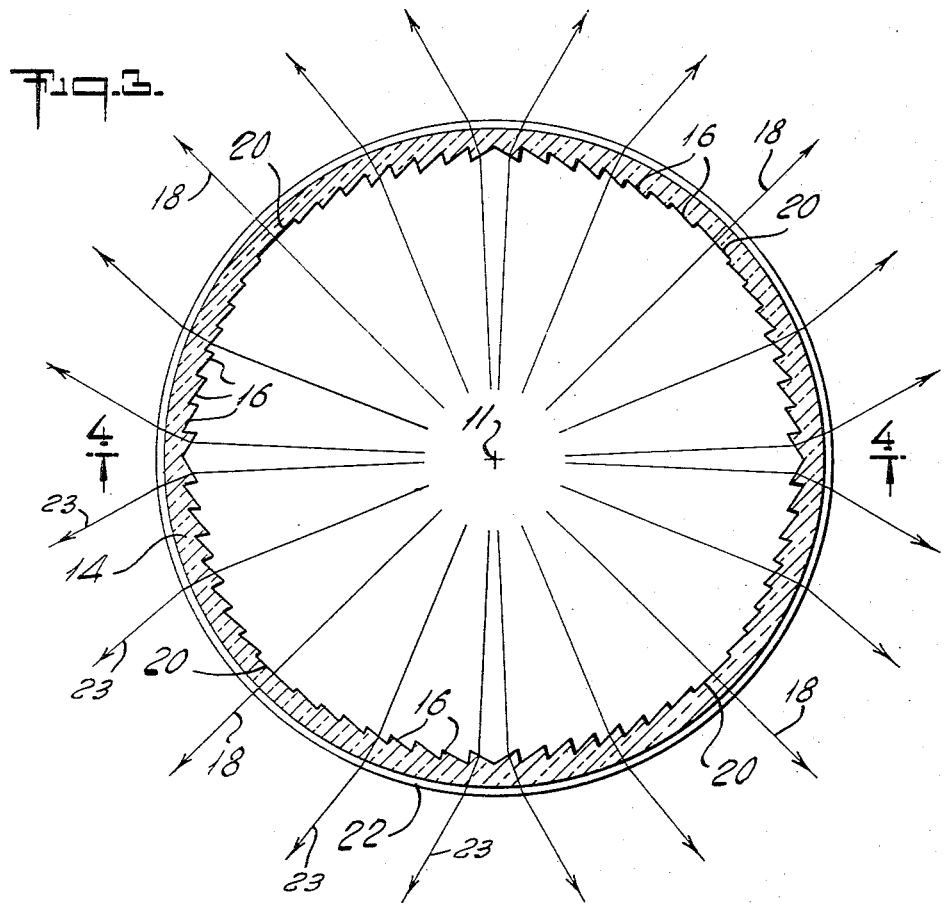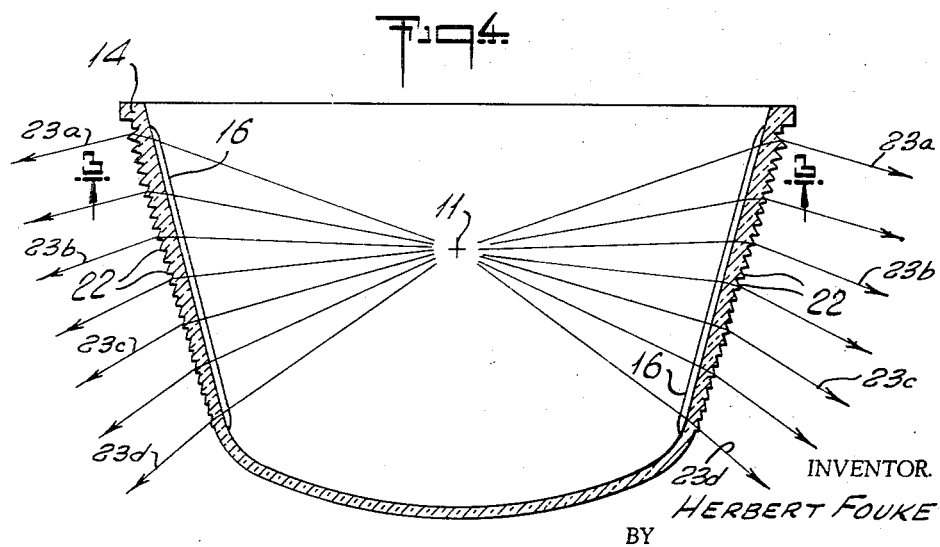

INVENTOR.
HERBERT FOUKE
BY
Nolte & Nolte
ATTORNEYS

United States Patent Office 3,344,268
Patented Sept. 26, 1967

3,344,268
REFRACTOR FOR USE IN UNIFORMLY ILLUMINATING A POLYGONAL AREA
Herbert A. Fouke, Newark, Ohio, assignor to Holophane Company, Inc., New York, N.Y., a corporation of Delaware
Continuation of application Ser. No. 308,461, Sept. 12, 1963. This application Jan. 25, 1966, Ser. No. 525,818
3 Claims. (Cl. 240—106)

ABSTRACT OF THE DISCLOSURE

A refractor for obtaining isolux light distribution patterns over polygonal areas is disclosed. The refractor is equipped with a plurality of circumferentially adjacent light transmissive wall sections corresponding in number to the number of corners of the polygonal light pattern. Each section has vertically oriented prisms with prism surfaces at the upper portion thereof which redirect light from a light source into paths substantially parallel to the direction of light passed through the uppermost portion of the section and prism surfaces at the lower portion of the prisms which redirect light from the light source into paths at angles laterally diverging from the parallel path of light emitted from said surfaces at said upper portion thereof.

This invention relates to refractors for obtaining equal light distribution patterns over large quadrilateral and other polygonal areas.

This is a continuation of application 308,461, filed Sept. 12, 1963.

Luminaires having laterally symmetric light distribution have been used to illuminate large outdoor areas, such as parking lots, shopping centers, outdoor work areas, or the like. Such luminaires produce circular light distribution patterns, both in terms of cones of candlepower distribution and in isolux curves, the latter being lines representing equal footcandle illumination levels. However, most areas where such luminaires are used are not circular, but rather square or rectangular in shape, and, therefore, a rectangular or square distribution of light would be more desirable for lighting purposes. However, a basic problem arises in attempting to distribute light from such luminaires in order to illuminate a polygonal area. That is, when light is raised from the normal circular pattern to reach the far corner areas of the square pattern, the candlepower of the raised beam will remain the same but the footcandles of illumination on the corner areas will decrease relative to the delivery at the sides of the pattern. This follows from the fact that the light, when raised, must travel a greater distance at a higher angle before it reaches the corner areas of the pattern. Thus, it is not just a matter of lifting the light at the corner areas to produce a quadrilateral illuminated area. The desired pattern should be isolux, with equal distribution of illumination along the sides of each quadrilateral area from the brightest area beneath the lighting unit to the area of least illumination at the outermost boundaries of the lighted area.

Accordingly, it is the primary object of this invention to provide a refractor capable of producing a polygonal isolux pattern on a surface to be illuminated.

Another object of the present invention is to obtain quadrilateral isolux patterns basically through lateral light concentration via refractor of the wide spread type and by vertical distribution of the light to be controlled either by the same refractor or by utilizing reflector means, or both.

The present invention, to accomplish the above objects, may be provided with circumferentially spaced vertical prisms on the interior wall of a refractor, the prisms being subdivided into four sections, each section containing approximately a quarter of the total number of prisms. The vertical prisms in each section are oriented in a manner to laterally redirect substantially all of the light incident thereon at the same angle towards a corner of the quadrilateral area, thereby laterally concentrating the emitted light in the direction of the corners at predetermined angles that vary with successive horizontal planes.

A plurality of horizontal prisms are arranged on the exterior surface of the refractor for vertically redirecting light at pedetermined angles, said angles being constant in every horizontal plane.

Further details and advantages of the invention will become apparent from the following detailed disclosure, reference being had to the accompanying drawings, wherein;

FIG. 1b is a diagrammatic representaton of the vertical light control of a prior art refractor which produces the circular isolux illumination pattern of FIG. 1a;

FIG. 3 is a horizontal section through a refractor according to the present invention taken along the line 3—3 of FIG. 4, and showing only the laterally acting vertical prisms thereof;

FIG. 4 is a vertical section through a refractor according to the invention taken along the line 4—4 of FIG. 3, and showing only the vertically acting horizontal prisms thereof;

Figure 2:
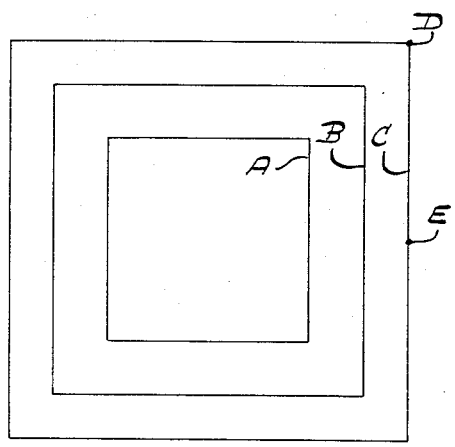
FIG. 2 is a diagrammatic representation of a square isolux illumination pattern produced in accordance with the present invention.
Figure 5:
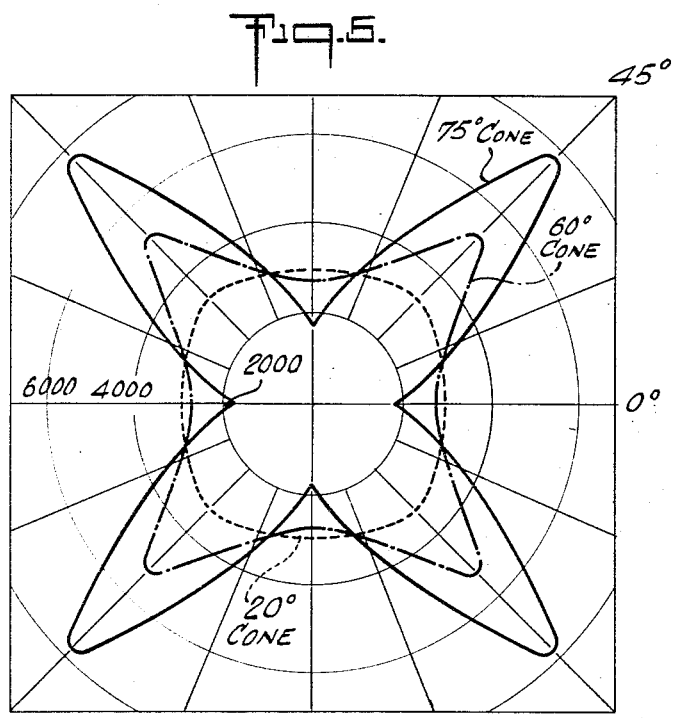
Figure 6:
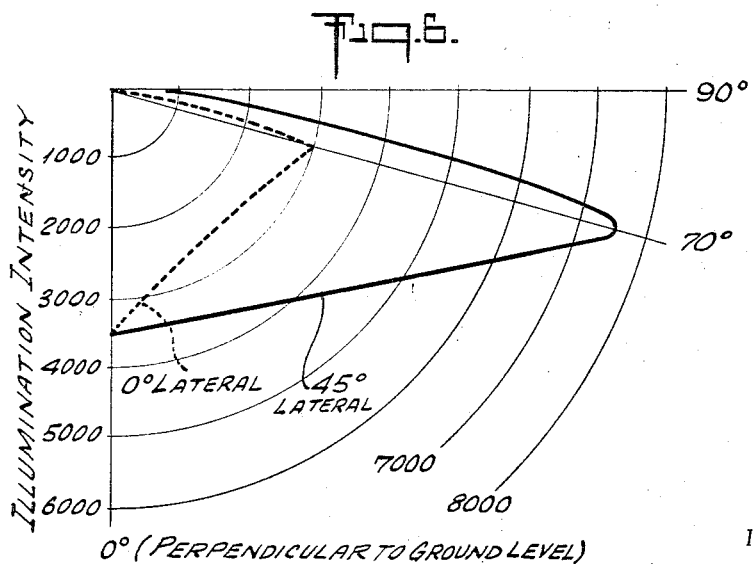

FIG. 5 shows the 75°, 60° and 20° candlepower distribution cones required for the square isolux distribution of FIG. 2; and FIG. 6 is a diagrammatic representation, showing the vertical distribution taken at the 0° and 45° lateral angles.

Figure 1:
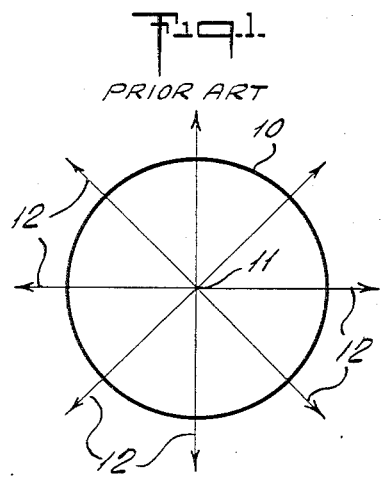
FIG. 1 is a diagrammatic representation of the lateral emission of light through a prior art refractor producing a circular isolux illumination pattern.
Figure 1B:
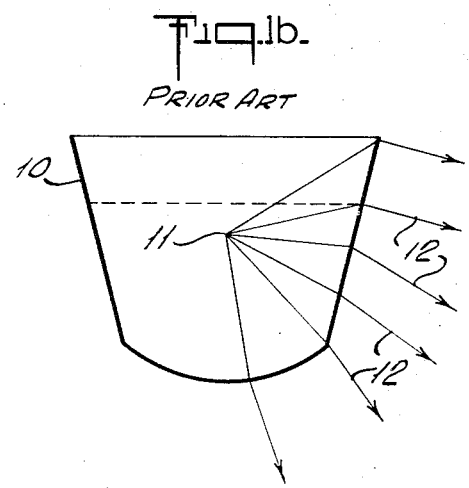

The prior art wide distribution refractors, such as refractor 10 in FIGS. 1 and 1b, are adapted to emit light from a light source 11 in all lateral directions, the laterally divergent light rays being indicated at 12 in FIG. 1.

Figure 1A:
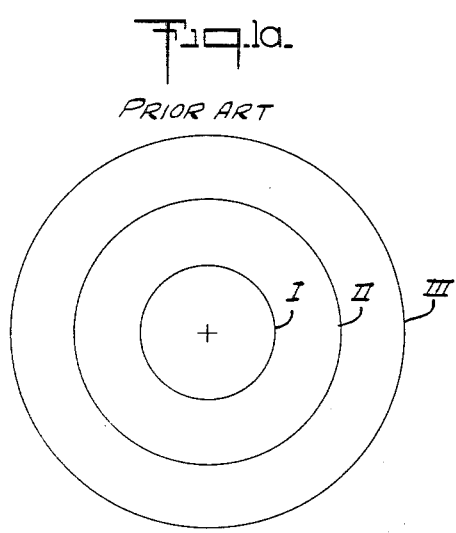
FIG. 1a is a diagrammatic representation of circular concentric isolux illumination patterns resulting from prior art wide distribution lighting units.

In addition, vertical control of the laterally divergent light rays 12 is not subject to rigorous control requirements, other than limiting the vertical emission below predetermined high angles to avoid excessive illumination in the glare zone and limit the light into the utilization zone. Consequently, in FIG. 1b the vertical distribution of light rays 12 of the prior art is shown. The circular isolux illumination pattern provided by the prior art refractor 10 is shown in FIG. 1a, wherein the circles I, II, and III are isolux circles tracing the equal illumination or isolux levels. Obviously, as the distance the light has to travel from the light source 11 increases, the illumination intensity of the isolux circle decreases. Thus, the intensity of circle I is greater than the isolux circle II and the illumination intensity along the isolux circle II is greater than that along the isolux circle III.

In FIG. 2 isolux squares A, B and C are produced by a refractor according to the present invention. The square distribution bounded by line C differs from the prior art circular distribution bounded by line III by the additional corner areas. To provide a square distribution these areas must also be illuminated. The candlepower required to produce equally intense illumination in a corner of any one of the isolux squares A, B or C, for instance at point D, and in the middle of the side wall of the same isolux pattern such as point E, will be unequal. Thus, due to the fact that the light has to travel a greater distance to reach point D than to reach point E, and the intensity of light drops proportionally to the second power of the distance it has to travel, more light has to be concentrated towards the corner areas.

Merely raising the light to point D while continuing to send light from the same vertical section of the refractor to point E would not provide a square distribution because the footcandle level at point D must be the same as E but since it is further away and at a higher angle more light must be sent at D than at E.

The refractor 14 according to the invention serves to provide a square isolux illumination pattern. A plurality of vertical prisms 16 are shown positioned circumferentially on the interior surface of the refractor (FIG. 3). The refractor is shown divided substantially into four equal areas or sections, the center of each section facing a corner of the desired isolux pattern. Light rays 18 pass radially through a non-refractive center portion 20 of each section towards a corner. The vertical prisms 16 in each section are designed to pass all light rays emanating from light source 11, at a lateral angle substantially parallel to the central rays 18, and to vary said lateral angles with successive horizontal planes in a predetermined direction, as shown in FIG. 3 where one lateral redirection is illustrated. Also, in each of the four sections proceeding in either direction from the point where central light ray 18 passes unhindered through prism-free portion 20 of the refractor, the angle of the light incident surface of prisms 16 is gradually varied. Hence, the light rays impinging upon the prism surfaces at different angles are refracted into substantially identical directions parallel to central light rays 18. The resulting lateral distribution is shown in FIG. 3, wherein light rays 23 coming through each section are substantially parallel and directed principally towards the corners of the isolux pattern.

In successively lower horizontal planes, the lateral redirection of emitted light rays 23 shown in FIG. 3 will vary for each vertically redirected light rays 23a, 23b, 23c and 23d respectively, as shown in FIG. 4, resulting in the desired distribution shown in FIG. 5. Thus, by successively increasing the angle of lateral redirection in each next lower horizontal plane by a predetermined disposition of prisms 16, so that said lateral angle will be greater in light ray 23b than in 23a, greater in ray 23c than in 23b, greater in ray 23d than in 23c, etc., the present invention produces a polygonal pattern.

To control the vertical distribution of the light, the refractor 14 is provided with a plurality of parallel coaxial outer prisms 22 horizontally disposed on the exterior surface of the refractor (FIG. 4). In determining the angular disposition of the horizontal outer prisms 22, the vertical angle of the light to be transmitted in the direction of maximum candlepower must be considered. This angle should be as large as possible to provide maximum fixture spacing in instances where the area to be illuminated requires the use of a plurality of fixtures, but at the same time, the amount of light transmitted at very high angles must be limited to prevent an undue amount of light in the glare zone. This latter requirement limits the maximum vertical angle. Generally, a seventy-five degree vertical angle for the maximum candlepower has been found satisfactory.

In FIG. 6 the vertical distribution of a preferred embodiment of a refractor according to the invention is shown, the solid-line curve representing the forty-five degree lateral, i.e. the direction of the center light rays 18, corresponding to the diagonal of the square isolux pattern, having a maximum vertical output at seventy-five degrees. The dotted-line curve of FIG. 6, represents the emission at the zero degree lateral, e.g. along the line 4—4 of FIG. 3, the vertical maximum in this case being at seventy degrees. From the considerations prevailing in corner-oriented light distribution, as discussed in connection with FIG. 3, the emission intensity at the zero degree lateral, as represented by the dotted line-curve of FIG. 6, will be smaller than that at the forty-five degree lateral represented by the solid curve.

The angular disposition of horizontal prisms 22 is a function of the vertical angle at which the maximum candlepower is desired, in this instance seventy-five degrees, and also the disposition and orientation of the vertical prisms 16. The determination of the angular disposition of the prisms 22 can be made by tracing circles over the desired isolux light distribution pattern, the circles corresponding to the bases of light projection cones having their apex in the light center 11. When the mounting height of the luminaire, the required illumination levels, and the light output of the lamps 11 are known, the desired candlepower distribution cones at the various vertical angles can be calculated. In FIG. 5 the candlepower distribution curves are shown for the seventy-five, sixty and twenty degree cones required for the square isolux distribution pattern at ground level shown in FIG. 2. The four legged curve for the 75° cone shown in FIG. 5 is formed by light rays 23a and those below, shown in FIG. 4. The more square shaped curve for the 60° cone is formed by light rays 23b and those below. The almost round shaped curve for the 20° cone is formed by light rays 23c and those below, etc.

In FIG. 4, vertically redirected light rays 23a, 23b, 23c and 23d represent emitted rays having vertical angles, measured from nadir, ranging from 75° to 20° respectively. The horizontal prisms 22 are disposed so as to result in a predetermined constant vertical angle for substantially all light emitted in every horizontal plane.

In reality, the corners of the square isolux pattern on the ground level may not be as sharp as shown in FIG. 2, but rather slightly rounded off, due to and depending on the size of the light emitting area of the particular lamp being used. However, for all practical purposes, the illumination pattern satisfies a square isolux requirement.

The difference in the distance that the light has to travel to the point D and to the point E (FIG. 2), in an outer concentric square isolux is greater than the similar distance in the case of an inner concentric isolux. For this reason, the difference between the light oriented at the forty-five degree lateral (FIG. 6) and the light oriented at the zero degree lateral must be greater in the case of a larger vertical angle light projection cone than a smaller cone. This accounts for the fact that the solid line curve in FIG. 5, representing the lateral light distribution of the seventy-five degree projection cone has large lobes in the corner directions, while only a small amount of light is directed toward the centers of the sides of the square isolux. On the other hand, the trace of the twenty degree cone in FIG. 5, represented by the dotted line, shows hardly any difference between the corner oriented and the sidewall oriented light.

If the desired isolux pattern is to be rectangular rather than square, the laterally acting prisms would be arranged within their respective quarter sections to direct the light from the lamp 11 at more than forty-five degrees to two of the four quarter areas, and at correspondingly less than forty-five degrees to the other two quarter areas. In the light of similar considerations, diamond shaped isolux illumination patterns, or polygonal patterns other than four-sided may also be produced.

The vertically acting horizontal prisms may be supplemented with, or if desired even replaced by, reflector means disposed over the light source and arranged to reflect the light into desired vertical angles before reaching the refractor.

The objects of the invention can also be achieved with a refractor divided into two vertical sections, as shown by the dotted line in FIG. 1b. The upper section can be subdivided laterally into four quadrants, as explained above, with each quadrant illuminating one of the corner areas of FIG. 2. The lateral action in this section concentrates the light along the diagonal of the square. The lower refractor section may be used to light a circular area inwardly of the corner areas, the perimeter of which reaches the sides of square C in the manner of the prior art.

It is to be understood that the invention was described by means of a preferred embodiment thereof, therefore, the entire scope of the invention is to be interpreted from the appended claims.

What is claimed is:

1. A refractor for use with a light source and including means for distributing light emitted from a light source into a polygonal isolux light pattern upon an area below and surrounding said refractor, said distributing means comprising light transmissive wall means for receiving the emitted light, said wall means including a plurality of circumferentially adjacent sections having vertically oriented prisms formed thereon, the number of said sections corresponding to the number of corners of the polygonal light pattern, said vertically oriented prisms of each said section having surfaces each of which toward the upper portion thereof comprises means for laterally redirecting the emitted light rays impinging thereon into paths extending generally parallel to the direction of the light passed through the centermost portion of each said section, said surfaces of said vertically oriented prisms of each said section further comprising toward the lower portion thereof means for laterally redirecting light impinging thereon into paths at angles laterally diverging from the parallel path of light emitted from said surfaces at said upper portion thereof.

2. The refractor means of claim 1 wherein said vertically oriented prisms are on the light incident surface of said wall means, and further including a plurality of vertically adjacent horizontally oriented prisms formed on said wall means on a side thereof opposite said vertically oriented prisms, said horizontally oriented prisms including surfaces comprising means for directing light which has been laterally redirected by said first named surfaces at downwardly diverging vertical angles and at substantially the same vertical angle throughout any given horizontal plane.

3. The refractor of claim 1 wherein said wall means and said surfaces are disposed relative to said light source so as to constitute means for laterally redirecting emitted light at increasingly divergent angles in successively lower horizontal planes from the surfaces at the upper portion of said prisms to the surfaces at the lower portion thereof.

References Cited

UNITED STATES PATENTS

| | | | |
|---|---|---|---|
| 1,596,006 | 8/1926 | Dorey | 240—106 |
| 3,099,405 | 7/1963 | Husby et al. | 240—106 |
| 3,249,750 | 5/1966 | Franck | 240—106 |
| 3,274,383 | 9/1966 | Dorman | 240—106 |

NORTON ANSHER, *Primary Examiner.*

W. M. FRYE, *Examiner.*